US012716396B2

(12) United States Patent
Nair

(10) Patent No.: US 12,716,396 B2
(45) Date of Patent: Aug. 25, 2026

(54) HIGH PRESSURE COMMON RAIL SYSTEM FAILURE DETECTION

(71) Applicant: Progress Rail Locomotive Inc, LaGrange, IL (US)

(72) Inventor: Adarsh Gopinathan Nair, Naperville, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 351 days.

(21) Appl. No.: 18/380,501

(22) Filed: Oct. 16, 2023

(65) Prior Publication Data

US 2025/0122855 A1 Apr. 17, 2025

(51) Int. Cl.

| | |
|---|---|
| ***F02M 65/00*** | (2006.01) |
| ***F02M 55/02*** | (2006.01) |
| ***G01M 15/04*** | (2006.01) |

(52) U.S. Cl.
CPC ........ *F02M 65/003* (2013.01); *F02M 55/025* (2013.01); *G01M 15/04* (2013.01)

(58) Field of Classification Search
CPC .... F02M 65/003; F02M 55/025; G01M 15/04
See application file for complete search history.

(56) References Cited

U.S. PATENT DOCUMENTS

| | | | | |
|---|---|---|---|---|
| 6,675,635 B2 * | 1/2004 | Kasen | ................ | G01N 33/2888 73/54.01 |
| 6,840,093 B2 * | 1/2005 | Kasen | ................ | G01N 33/2888 73/61.78 |
| 8,095,261 B2 | 1/2012 | Howell et al. | | |
| 8,301,333 B2 | 10/2012 | Singh et al. | | |
| 10,526,994 B2 * | 1/2020 | Taxon | ................. | F02D 41/3827 |
| 11,668,262 B2 * | 6/2023 | Taxon | ................. | F02D 41/3845 701/107 |

FOREIGN PATENT DOCUMENTS

| | | |
|---|---|---|
| CN | 106227200 A | 12/2016 |
| CN | 110597227 A | 12/2019 |
| CN | 110309612 B | 7/2021 |
| KR | 102123522 B1 | 6/2020 |

* cited by examiner

*Primary Examiner* — Freddie Kirkland, III

(57) ABSTRACT

Techniques for detecting failures associated with fuel distribution systems. The techniques may include receiving first oil pressure data associated with an engine of a machine and receiving second oil pressure data associated with a high-pressure pump supplying fuel to the engine. Based at least in part on the first oil pressure data and the second oil pressure data, an impending failure associated with the high-pressure pump may be determined. For instance, utilizing the first oil pressure data and the second oil pressure data, a difference between a first oil pressure value associated with the engine and a second oil pressure value associated with the high-pressure pump may be calculated. The difference in the oil pressure values and the second oil pressure value may be indicative of the impending failure. In some instances, an action may be performed based on detecting the impending failure.

20 Claims, 6 Drawing Sheets

HIGH PRESSURE COMMON RAIL SYSTEM FAILURE DETECTION

TECHNICAL FIELD

The present disclosure relates generally to techniques for detecting failures associated with a high-pressure common rail (HPCR) fuel injection system and, more specifically, to detecting HPCR fuel pump lower-end failures and/or oil filter failures.

BACKGROUND

Work machine prime movers, such as internal combustion engines, fuel cells, batteries, and the like, are widely used in various industries. For example, diesel engines are one type of internal combustion engine which run on diesel fuel and are widely used in various applications due to their efficiency and durability. Diesel engines are built robustly to withstand high compression pressures and heavy loads, and their sturdiness makes them well-suited for a wide range of industrial, commercial, light-duty, and heavy-duty applications, including, but not limited to, cars, trucks, buses, locomotives, ships, power generators, agricultural machinery, and construction equipment. Despite the advancements and popularity of gasoline, electric, and hybrid technologies, diesel engines remain a crucial component of many industries, especially in long-haul transportation and heavy-duty applications where torque and efficiency are important. As such, manufacturers continue to refine diesel engine designs to meet strict emissions regulations while maintaining their efficiency and reliability.

One such example of an advancement in diesel engine design was the introduction of the high-pressure common rail (HPCR) fuel distribution system. Most modern diesel engines utilize these HPCR fuel injection systems, which are advanced fuel injection systems that enhance efficiency and performance, while helping to reduce emissions and noise commonly associated with diesel engines. Thus, these HPCR fuel injection systems represent a significant technological leap from traditional fuel injection methods, and their widespread adoption has revolutionized the diesel engine industry. In a HPCR system, the fuel is stored at extremely high pressures (up to 35,000 psi) in a common rail, which is essentially a reservoir that feeds fuel to individual injectors. Unlike older systems that relied on mechanical components, high-pressure common rail systems utilize electronically controlled injectors, which allow for precise and flexible fuel delivery.

Generally, a HPCR fuel injection system includes a high-pressure pump, also referred to as a HPCR pump, which is used to generate the required fuel pressure in the common rail that ultimately feeds the injectors. In many cases, oil is used as a lubricant in the HPCR pump and the oil is generally filtered before it enters the HPCR pump with the help of a spin-on filter. Unfortunately, however, these HPCR pumps and their related components can still experience failures that cause issues for the diesel engine. For instance, lower-end failures of the HPCR pump, as well as the spin-on filter plugging, can cause engine shutdowns resulting in on-road failures and unscheduled stopping.

Various efforts have been made to improve upon the overall design of these common rail systems, as well as to detect engine failures. For example, Korean Patent No. 100448123B1 (hereinafter the "'123 patent") describes techniques for checking the occurrence of cracks in a cylinder head. The system of the '123 patent uses a positive pressure valve that is connected side by side with a pressure supply for determining whether a crack in the cylinder head has occurred. However, the system described in the '123 patent can be limited in its use, as the system is not configured to detect fuel distribution system failures and, more specifically, lower end HPCR pump failures or spin-on filter failures associated with a HPCR fuel injection system.

Examples of the present disclosure are directed to overcoming deficiencies of such systems.

SUMMARY

In one aspect of the present disclosure, the techniques described herein relate to a method including: receiving first oil pressure data associated with a prime mover of a machine; receiving second oil pressure data associated with a high-pressure pump supplying fuel to the prime mover; determining, based at least in part on the first oil pressure data and the second oil pressure data, an impending failure associated with the high-pressure pump; and sending, over a communication network, an indication of the impending failure to a computing device associated with an end user of the machine.

In another aspect of the present disclosure, the techniques described herein relate to a system, including: one or more processors; and one or more non-transitory computer-readable media storing instructions that, when executed, cause the one or more processors to perform operations including: receiving first oil pressure data associated with an engine of a machine; receiving second oil pressure data associated with a high-pressure pump supplying fuel to the engine; determining, based at least in part on the first oil pressure data and the second oil pressure data, an impending failure associated with the high-pressure pump; and sending, over a communication network, an indication of the impending failure to a computing device associated with an end user of the machine.

In yet another aspect of the present disclosure, the techniques described herein relate to a system including: a first oil pressure sensor for measuring input oil pressure flowing to an engine of a machine and a high-pressure common rail (HPCR) pump associated with a fuel distribution system of the machine; a second oil pressure sensor for measuring the input oil pressure flowing to the HPCR pump; one or more processors; and one or more non-transitory computer-readable media storing instructions that, when executed, cause the one or more processors to perform operations including: determining, based at least in part on first oil pressure data generated by the first oil pressure sensor, a first oil pressure value associated with the input oil pressure flowing to the engine and the HPCR pump; determining, based at least in part on second oil pressure data generated by the second oil pressure sensor, a second oil pressure value associated with the input oil pressure flowing to the HPCR pump; determining a difference between the first oil pressure value and the second oil pressure value; determining an impending failure associated with the HPCR pump based at least in part on the difference and the second oil pressure value; and sending, over a communication network, an indication of the impending failure to a computing device associated with an end user of the machine.

DETAILED DESCRIPTION

Figure 1:
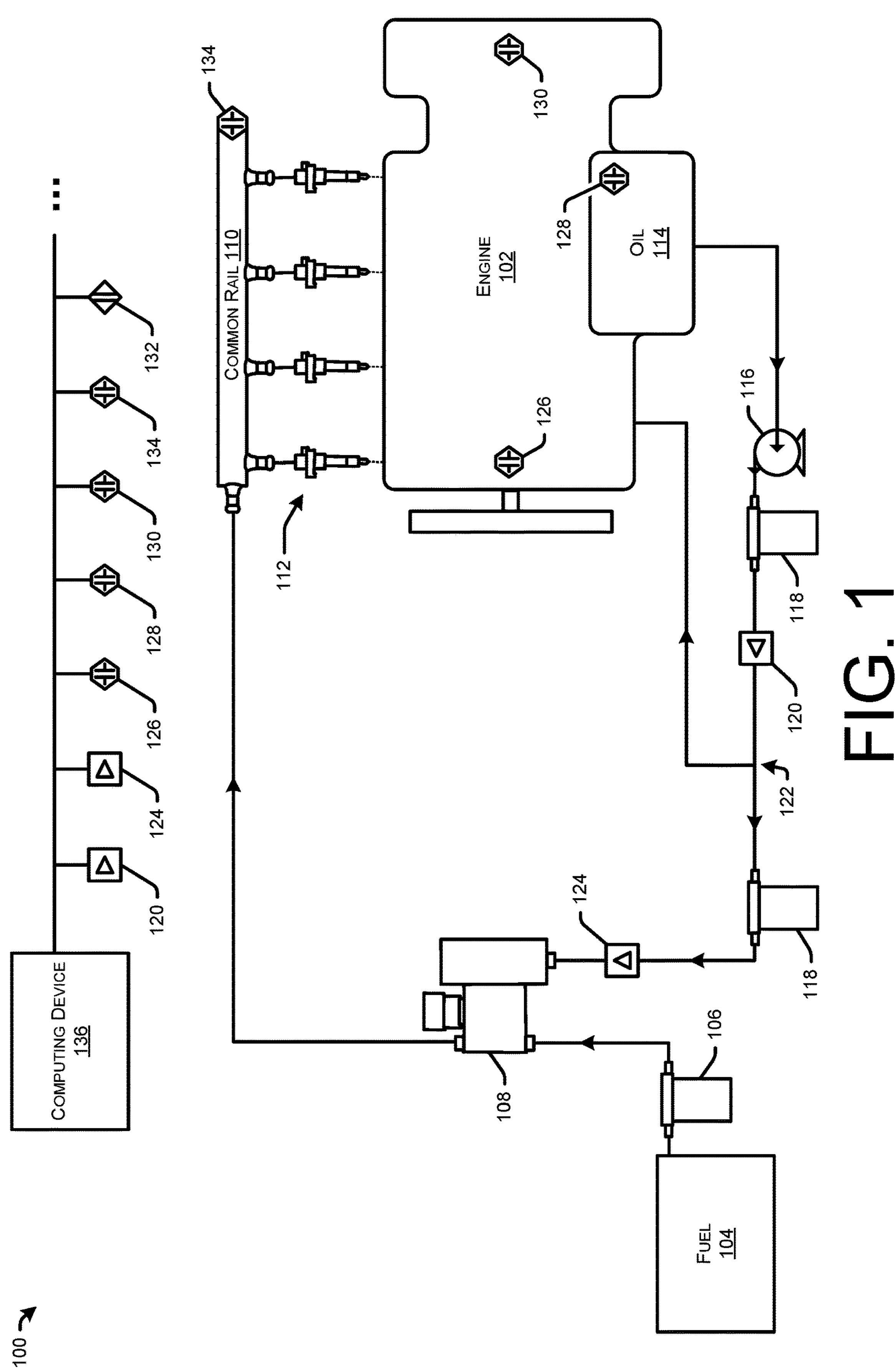
FIG. 1 is a schematic illustration of an example system that may utilize aspects of the technologies disclosed herein to detect failures associated with a HPCR fuel injection system, in accordance with one or more examples of the present disclosure.

Wherever possible, the same reference numbers will be used throughout the drawings to refer to same or like parts. Referring to FIG. 1, a schematic illustration of an example system 100 is shown. In examples, the system 100 may represent a portion of a HPCR fuel injection system, and the system 100 may utilize aspects of the technologies disclosed herein to detect failures associated with the HPCR fuel injection system. As will be described in greater detail below, the system 100 and/or the various components therein may be configured to perform a high-pressure common-rail pump lower end failure and/or spin-on filter plugging detection algorithm, which is a data-based algorithm that takes into account various engine inputs/outputs, the HPCR pump oil pressures, fuel control valve (FCV) positions/movement, and/or rail pressure feedback to detect failures/impending failures. Further, the system 100 and/or components therein may perform the algorithm to classify the failures/impending failures into either HPCR pump lower-end failures, spin-on filter failures (e.g., filter plugging, etc.), and/or other failure classifications.

The system 100 includes an engine 102. As used herein, the engine 102 is a type of prime mover that may be used separately from, or in conjunction with, other systems such as batteries, fuel cells, and the like. The engine 102 is an internal combustion engine that burns a fuel 104 which may be stored in a tank. While several examples of the present disclosure describe that the fuel 104 is diesel fuel, the fuel 104 may include an alcohol fuel such as methanol or ethanol, for example, or other fuel types (e.g., gasoline, liquid natural gas, propane, kerosene, etc.). In examples, the fuel 104 may flow through a fuel filter 106 and into a high-pressure pump 108. The high-pressure pump 108 may also be referred to herein as a "high-pressure common rail (HPCR) pump" as the high-pressure pump 108 pumps the fuel 104 into a common rail 110. The common rail 110, which may also be referred to herein simply as a "rail," is a fuel line that supplies the fuel 104 to injectors 112 of the engine 102. It should be noted that the presently disclosed subject matter is not limited to the use of fuel rails.

The engine 102 may be lubricated using oil 114. In examples, an oil pump 116 may pump the oil 114 from an oil reservoir (e.g., oil pan) and through oil filters 118. Throughout the disclosure, the oil filters 118 may also be referred to as a "spin-on filter." The system 100 includes two oil filters 118 as shown. However, in some examples, more or less oil filters may be used. The oil 114 may then flow into the high-pressure pump 108 and back into the engine 102, both for lubrication purposes. Exemplary supply lines for the fuel 104 and the oil 114, as well as their flow directions, are illustrated in FIG. 1. It is to be appreciated that, while contemplated, return lines from the high-pressure pump 108 for the fuel lines and/or the oil lines are not illustrated in FIG. 1 for simplicity and ease of understanding.

In some examples, a first oil pressure sensor 120 may be disposed between the oil pump 116 and a split 122 in the oil supply line. The split 122 in the oil supply line may facilitate the distribution of the oil 114 to both the high-pressure pump 108 and the engine 102, as shown. Additionally, a second oil pressure sensor 124 may be disposed between the split 122 in the oil supply line and the high-pressure pump 108. That is, the second oil pressure sensor 124 may be disposed between the oil filter 118 and the high-pressure pump 108. In examples, the oil pressure sensors may generate oil pressure data associated with the oil 114 flowing though the oil supply lines at the points where the sensors are disposed.

The system 100 also includes other various sensors as well, including, but not limited to, an engine speed sensor 126 (e.g., for measuring engine rotations per minute (RPM)), an oil temperature sensor 128, an engine power sensor 130 (e.g., measuring engine power output in watts), a barometric pressure sensor 132, and a fuel pressure sensor 134 (e.g., for measuring the fuel pressure in the common rail 110). The system 100 also includes a computing device 136 which may be connected to the various sensors described above, as well as, in some examples, connected to various components of the system 100, such as the engine 102 and the high-pressure pump 108. In some examples, the computing device 136 may be a computer controller and/or a remote monitoring system, as a cloud service, or a local back office networking platform. That is, while a computing device may be on-board the machine that includes the engine 102, the methods of this disclosure for detecting failures associated with HPCR systems can be performed by external and/or remote computing devices.

As noted above, the system 100 and the various components illustrated therein, such as the computing device 136, may be configured to perform and/or utilize aspects of the technologies disclosed herein for detecting failures associated with a fuel distribution system (e.g., the high-pressure pump 108 and/or its associated components, such as the common rail 110, the oil filter 118, and the like). For instance, the computing device 136 may, in some examples, receive first oil pressure data associated with the engine 102, which may belong to or otherwise be used to power a machine. That is, the computing device 136 may receive the first oil pressure data from the first oil pressure sensor 120 illustrated in FIG. 1. As such, the first oil pressure data may be indicative of an input oil pressure flowing into both the engine 102 and the high-pressure pump 108. Additionally, the computing device 136 may receive second oil pressure data associated with the high-pressure pump 108 supplying the fuel 104 to the engine 102 (e.g., via the common rail 110 and the injectors 112). For instance, the second oil pressure data may be received from the second oil pressure sensor 124, and the second oil pressure data may be indicative of an input oil pressure flowing into the high-pressure pump 108.

In some examples, the computing device 136 may be configured to determine, based at least in part on the first oil pressure data and the second oil pressure data, a presence of an impending failure associated with the high-pressure pump 108. That is, the computing device 136 may be capable of detecting a failure associated with the high-pressure pump 108, and/or the HPRC fuel distribution system in general, prior to the failure actually occurring at a magnitude that causes an engine 102 failure and/or an unplanned stop. For example, the computing device 136 may (i) determine, based at least in part on the first oil pressure data, a first oil pressure value associated with the flow of the oil 114 to both the engine 102 and the high-pressure pump 108, (ii) determine, based at least in part on the second oil pressure data, a second oil pressure value associated with the flow of oil 114 to the high-pressure pump 108, and (iii) determine a difference between the first oil pressure value and the second oil pressure value which is at least partially indicative of the impending failure. In some examples, the presence of the impending failure may be determined, by the computing device 136, based on a value of the difference relative to a first threshold, as well as the second oil pressure value relative to a second threshold. For instance, if the difference is greater than the first threshold and the second oil pressure value is less than the second threshold, the impending failure may be confirmed. Additionally, or alternatively, if the difference is less than the first threshold and the second oil pressure value is greater than the second threshold, then the impending failure may also be confirmed.

In some examples, the computing device 136 may perform one or more actions based at least in part on detecting the impending failure associated with the HPCR fuel injection system. For instance, the computing device 136 may cause an indication of the impending failure to be sent, over a network, to a computing device (e.g., personal computer, phone, tablet, etc.) associated with an end user of the engine 102. Additionally, or alternatively, the computing device 136 may set an error flag, cause a warning to be displayed (e.g., on a dashboard of a machine that includes the system 100), by providing an indication to a user or machine profile to which the system 100 is associated with, and/or the like. In some examples, the computing device 136 may indicate a cause of the failure/impending failure, such as whether the failure is due to a lower-end failure in the high-pressure pump 108 (e.g., failure of pump cam components), due to a plugging of the oil filter 118 disposed between the split 122 and the high-pressure pump 108, or the like. For example, the computing device 136 may determine that an increase in at least one of a fuel control valve position or a rail pressure variation has occurred, which is indicative that the failure is associated with the high-pressure pump 108 itself (e.g., a lower-end failure, upper-end failure, etc.). Additionally, or alternatively, the computing device 136 may determine that both of the fuel control valve position or the rail pressure variation have remained constant, which may be indicative that the failure/impending failure is being caused by the oil filter 118. In some examples, the failures detected by the computing device 136 may also include upper-end failures of the high-pressure pump 108.

In some examples, the computing device 136 may detect the failure/impending failure based on multiple data points collected over a period of time. For instance, the first oil pressure data and the second oil pressure data may be received during a first data collection period, while addition oil pressure data may be received from the respective sensors during a second data collection period, third data collection period, etc. As such, if a failure condition is met during, for instance, two of the last three data collection periods, the failure may be confirmed. As an example, the computing device 136 may determine, based at least in part on the first oil pressure data and the second oil pressure data, that a failure condition is satisfied during the first data collection period. Additionally, the computing device 136 may receive, during a second data collection period, third oil pressure data from the first oil pressure sensor 120 and fourth oil pressure data from the second oil pressure sensor 124. As such, the computing device 136 may determine, based at least in part on the third oil pressure data and the fourth oil pressure data, that the failure condition is satisfied during the second data collection period. Because the failure condition was satisfied for two data collection periods, the computing device 136 may confirm the presence of the impending failure. In some examples, the computing device 136 may confirm the presence of the impending failure based at least in part on a determination that no more than one other data collection period intervened between the first data collection period and the second data collection period (e.g., two of the last three collection periods indicate a failure).

In some examples, the computing device 136 may determine corrected or universal oil pressure values based on the raw oil pressure data received from the first oil pressure sensor 120 and/or the second oil pressure sensor 124. For instance, the computing device 136 may utilize data and measurements obtained from other sensors including, but not limited to, the engine speed sensor 126, the oil temperature sensor 128, the engine power sensor 130, and/or the barometric pressure sensor 132, to determine the corrected/universal oil pressure values. In some examples, the computing device 136 may determine the presence of the failure/impending failure using the corrected or universal oil pressure values. That is, in some examples, instead of using the raw oil pressure data received from the oil pressure sensors, the computing device 136 may utilize the corrected oil pressure values. In some instances, this may allow the techniques disclosed herein to be applied across a wide selection of systems that utilize HPCR fuel injection systems.

Figure 2:
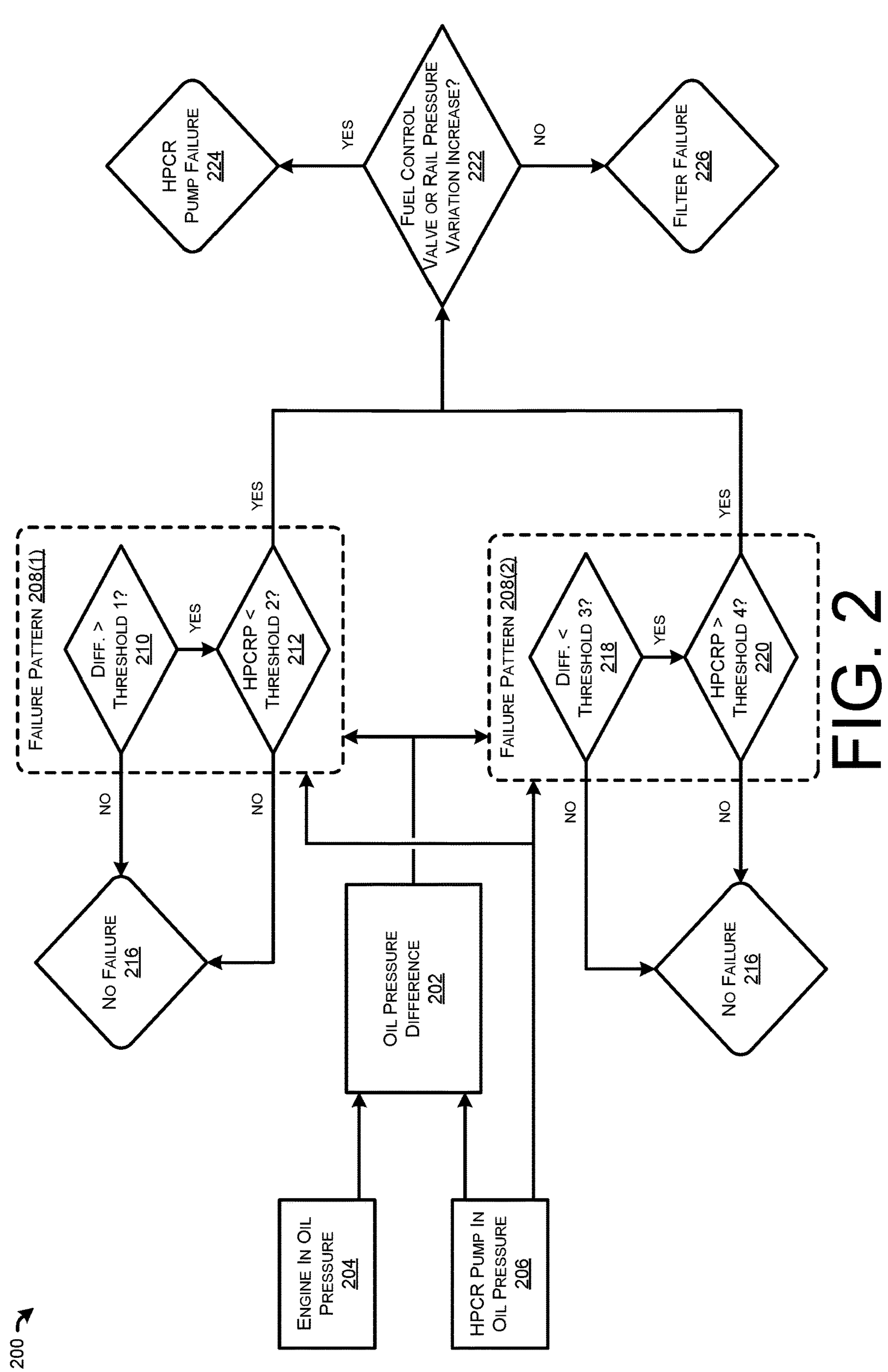
FIG. 2 is a block diagram illustrating an example process for detecting failures associated with a HPCR fuel injection system, in accordance with one or more examples of the present disclosure.

FIG. 2 is a block diagram illustrating an example process 200 for detecting failures associated with a HPCR fuel injection system, in accordance with one or more examples of the present disclosure. The order in which the operations of the process 200 are described is not intended to be construed as a limitation, and any number of the described operations can be combined in any order and/or in parallel to implement the processes. Further, many of the operations described herein may be described with reference to the system 100 of FIG. 1 for illustration purposes. However, the process 200 is not limited to being performed by the system 100 and the components therein, and the system 100 is not limited to performing the process 200.

At operation 202, an oil pressure difference is calculated based on an engine input oil pressure 204 and a HPCR pump input oil pressure 206. For instance, to calculate the oil pressure difference at operation 202, the computing device 136 may receive first oil pressure data associated with the engine 102 and second oil pressure data associated with the high-pressure pump 108. That is, the computing device 136 may receive the first oil pressure data from the first oil pressure sensor 120 that is indicative of an input oil pressure flowing into both the engine 102 and the high-pressure pump 108, as well as receive the second oil pressure data from the second oil pressure sensor 124 that is indicative of an input oil pressure flowing into the high-pressure pump 108.

In examples, the oil pressure difference calculated at operation 202 and the HPCR pump input oil pressure 206 may be used as inputs to a first failure pattern 208(1) and a second failure pattern 208(2) (herein after referred to collectively as "failure patterns 208"). In examples, the failure patterns 208 may be executed independently of one another by the computing device 136. With respect to the first failure pattern 208(1), the operations included therein include a first operation 210 in which a determination is made as to whether the oil pressure difference exceeds a first threshold, as well as a second operation 212 in which a determination is made as to whether the HPCR pump input oil pressure is less than a second threshold. In examples, the first threshold and the second threshold may be based on expected values for the difference and the HPCR pump input oil pressure, based on past failures, etc. For instance, the computing device 136 may determine the first threshold and the second threshold based on historical oil pressure and difference values associated with the specific system in which the computing device 136 is deployed, based on other values from similar machines/systems, or the like. In some examples, the thresholds may be calculated based on other factors as well, including the other sensors of the system (e.g., engine RPM, fuel flow, fuel pressure, oil temperature, engine output power, barometric pressure, etc.).

In examples, if both the output of the first operation 210 and the second operation 212 are "yes" (or "1"), then the failure condition is met and the flow proceeds to operation 222. However, if either one of the outputs of the first operation 210 or the second operation 212 is "no" (or "0"), then a no failure condition 216 is met for the first failure pattern 208(1). However, a no failure condition 216 for the first failure pattern 208(1) does not necessarily mean that there is no failure/impending failure at all for the HPCR system, as the second failure pattern 208(2) may alternatively reveal that a failure condition is met. In examples, operation 210 and operation 212 may be evaluated independent of one another or in a different order than shown in FIG. 2.

With respect to the second failure pattern 208(2), the operations included therein include a first operation 218 in which a determination is made as to whether the oil pressure difference is less than a third threshold, as well as a second operation 220 in which a determination is made as to whether the HPCR pump input oil pressure is greater than a fourth threshold. In examples, the third threshold and the fourth threshold may be based on expected values for the difference and the HPCR pump input oil pressure, based on past failures, etc. For instance, the computing device 136 may determine the third threshold and the fourth threshold based on historical oil pressure and difference values associated with the specific system in which the computing device 136 is deployed, based on other values from similar machines/systems, or the like. In some examples, the thresholds may be calculated based on other factors as well, including the other sensors of the system (e.g., engine RPM, fuel flow, fuel pressure, oil temperature, engine output power, barometric pressure, etc.). In some examples, the first threshold and the third threshold may be the same or different values, and the second threshold and the fourth threshold may be the same or different values. In examples, the threshold values may change based on throttle position, engine RPM, power, etc. That is, the threshold values may not always be constant, but may change depending on the scenario.

In examples, if both the output of the first operation 218 and the second operation 220 of the second failure pattern 208(2) are "yes" (or a "1"), then the failure condition is met and the flow proceeds to operation 222. However, if either one of the outputs of the first operation 218 or the second operation 220 is "no" (or a "0"), then a no failure condition 216 is met for the second failure pattern 208(2). Similar to above, a no failure condition 216 for the second failure pattern 208(2) does not necessarily mean that there is no failure/impending failure at all for the HPCR system, as the first failure pattern 208(1) may alternatively reveal that a failure condition is met.

If one of the failure patterns 208 is met and the process 200 proceeds to operation 222, a determination is made as to whether a fuel control valve position has increased and/or if common rail pressure variations have increased. For instance, the computing device 136 may determine, based on sensor data indicative of the fuel control valve position and/or the common rail pressure, whether the fuel control valve position has increased (e.g., relative to a threshold, previous positions, expected positions, etc.) and/or whether the rail pressure variations have increased (e.g., relative to a threshold, previous pressures, expected pressures, etc.). If it is determined that the fuel control valve position has increased and/or that the rail pressure variations have increased, then a HPCR pump failure 224 (e.g., a HPCR pump lower-end failure or upper-end failure) is what is causing the failure. Alternatively, if it is determined that the fuel control valve position and/or the rail pressure variations have not increased (e.g., decreased, remained constant, etc.), then a filter failure 226 (e.g., filter plugging) is what is causing the failure. In other words, at operation 222, the computing device 136 may determine whether the failure/impending failure is to be classified as a HPCR pump failure or a filter plugging failure.

Figure 3:
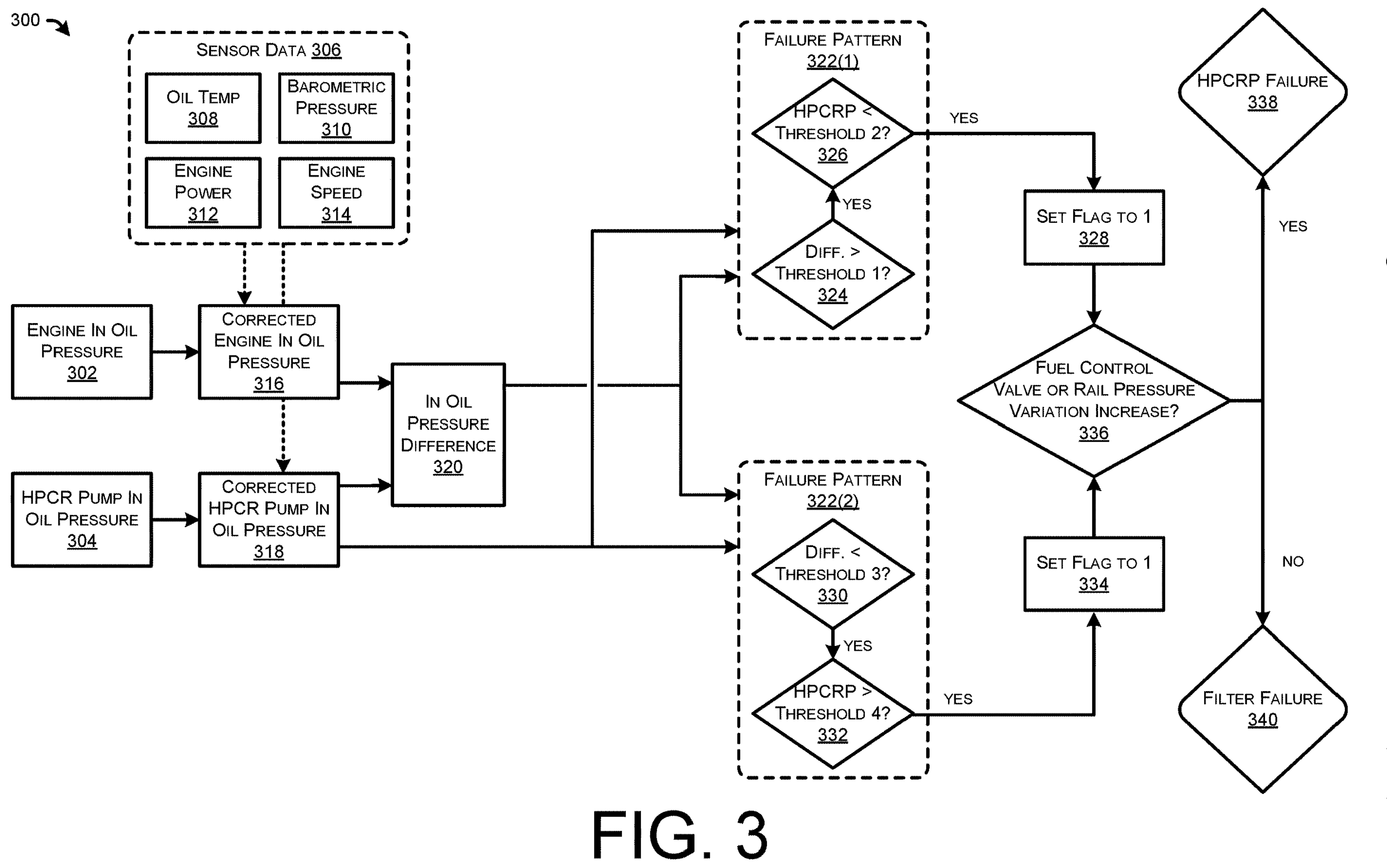
FIG. 3 is a block diagram illustrating another example process for detecting failures associated with a HPCR fuel injection system, in accordance with one or more examples of the present disclosure.

FIG. 3 is a block diagram illustrating another example process 300 for detecting failures associated with a HPCR fuel injection system, in accordance with one or more examples of the present disclosure. The order in which the operations of the process 300 are described is not intended to be construed as a limitation, and any number of the described operations can be combined in any order and/or in parallel to implement the processes. Further, many of the operations described herein may be described with reference to the system 100 of FIG. 1 for illustration purposes. However, the process 300 is not limited to being performed by the system 100 and the components therein, and the system 100 is not limited to performing the process 300.

At operation 302, engine input oil pressure data is received. For instance, the computing device 136 may receive the engine input oil pressure data from the first oil pressure sensor 120, which may be indicative of a pressure of oil flowing into the engine 102 and the high-pressure pump 108. Similarly, at operation 304, HPCR pump input oil pressure data is received. For instance, the computing device 136 may receive the HPCR pump input oil pressure data from the second oil pressure sensor 124, which may be indicative of a pressure of oil flowing into the high-pressure pump 108.

At operation 306, additional sensor data is received. This sensor data may include oil temperature data 308, barometric pressure data 310, engine power data 312, and engine speed data 314. For instance, the computing device 136 may receive the oil temperature data 308 from the oil temperature sensor 128, the barometric pressure data 310 from the barometric pressure sensor 132, the engine power data 312 from the engine power sensor 130, and the engine speed data 314 from the engine speed sensor 126.

At operation 316, a corrected engine input oil pressure is determined. For instance, the computing device 136 may calculate the corrected engine input oil pressure (e.g., value) based at least in part on the engine input oil pressure data and the additional sensor data. Similarly, at operation 318, a corrected HPCR pump input oil pressure is determined. As with the corrected engine input oil pressure, the corrected HPCR pump input oil pressure (e.g., value) may also be calculated based at least in part on the additional sensor data.

At operation 320, a difference between the input oil pressures is calculated. That is, a difference between the corrected engine input oil pressure and the corrected HPCR pump input oil pressure is calculated or otherwise determined. In some examples, the computing device 136 may determine the difference by subtracting the corrected HPCR pump input oil pressure from the corrected engine input oil pressure. For example, if the corrected engine input oil pressure is 20 psi, and the corrected HPCR pump input oil pressure is 8 psi, then the difference may be equal to 12 psi.

The corrected HPCR pump input oil pressure and oil pressure difference may then be used as an input to the first failure pattern 322(1) and the second failure pattern 322(2) (hereinafter collectively referred to as "failure patterns 322"), which may be similar to the failure patterns 208 described in FIG. 2. In examples, the failure patterns 322 may be executed independently of one another. For example, if a failure condition is met in the first failure pattern 322(1), then the process 300 may proceed to operation 328 and/or operation 336 regardless of the outcome of the second failure pattern 322(2), and vice-versa.

With respect to the first failure pattern 322(1), the operations included therein include a first operation 324 in which a determination is made as to whether the oil pressure difference exceeds a first threshold, as well as a second operation 326 in which a determination is made as to whether the HPCR pump input oil pressure is less than a second threshold. In examples, the first threshold and the second threshold may be based on expected values for the difference and the HPCR pump input oil pressure. For instance, the computing device 136 may determine the first threshold and the second threshold based on historical oil pressure and difference values associated with the specific system in which the computing device 136 is deployed, based on other values from similar machines/systems, or the like. In some examples, the thresholds may be calculated based on other factors as well, including the other sensors of the system (e.g., engine RPM, fuel flow, fuel pressure, oil temperature, engine output power, barometric pressure, etc.). In examples, the threshold values may change based on throttle position, engine RPM, power, etc. That is, the threshold values may not always be constant, but may change depending on the scenario.

In examples, if both the output of the first operation 324 and the second operation 326 are "yes" (or "1"), then the process 300 proceeds to operation 328, where a flag for this set of data points/cycle is set to a value of 1. In examples, if the value of the flag is set to 1 for at least two of the past three evaluation points/cycles, then the failure condition is confirmed and the flow proceeds to operation 336. However, if either one of the outputs of the first operation 324 or the second operation 326 is "no" (or "0"), then a no failure condition is met for the first failure pattern 322(1), at least for that evaluation cycle, and the process 300 may proceed back to the beginning (e.g., operation 302). However, as described briefly above, a no failure condition for the first failure pattern 322(1) does not necessarily mean that there is no failure/impending failure at all for the HPCR system, as the second failure pattern 322(2) may alternatively reveal that a failure condition is met.

With respect to the second failure pattern 322(2), the operations included therein include a first operation 330 in which a determination is made as to whether the oil pressure difference is less than a third threshold, as well as a second operation 332 in which a determination is made as to whether the HPCR pump input oil pressure is greater than a fourth threshold. In examples, the third threshold and the fourth threshold may be based on expected values for the difference and the HPCR pump input oil pressure. For instance, the computing device 136 may determine the third threshold and the fourth threshold based on historical oil pressure and difference values associated with the specific system in which the computing device 136 is deployed, based on other values from similar machines/systems, or the like. In some examples, the thresholds may be calculated based on other factors as well, including the other sensors of the system (e.g., engine RPM, fuel flow, fuel pressure, oil temperature, engine output power, barometric pressure, etc.). In some examples, the first threshold and the third threshold may be the same or different values, and the second threshold and the fourth threshold may be the same or different values.

In examples, if both the output of the first operation 330 and the second operation 332 of the second failure pattern 322(2) are "yes" (or a "1"), then the process 300 may proceed to operation 334, where a flag for this set of data points/cycle is set to a value of 1. In examples, if the value of the flag is set to 1 for at least two of the past three evaluation points/cycles, then the failure condition is confirmed and the flow proceeds to operation 336. However, if either one of the outputs of the first operation 330 or the second operation 332 is "no" (or a "0"), then a no failure condition is met for the second failure pattern 322(2), at least for that evaluation/cycle, and the process 300 may repeat or proceed back to the beginning. Similar to above, a no failure condition for the second failure pattern 322(2) does not necessarily mean that there is no failure/impending failure at all for the HPCR system, as the first failure pattern 322(1) may alternatively reveal that a failure condition is met.

If one of the failure patterns 322 is met and confirmed for two or more evaluation cycles (e.g., flag set to "1" multiple times, two of last three cycles, etc.), the process 300 proceeds to operation 336, where a determination is made as to whether a fuel control valve position has increased and/or if common rail pressure variations have increased. For instance, the computing device 136 may determine, based on sensor data indicative of the fuel control valve position and/or the common rail pressure, whether the fuel control valve position has increased (e.g., relative to a threshold, previous positions, expected positions, etc.) and/or whether the rail pressure variations have increased (e.g., relative to a threshold, previous pressures, expected pressures, etc.). If it is determined that the fuel control valve position has increased and/or that the rail pressure variations have increased, then a HPCR pump failure 338 (e.g., a HPCR pump lower-end failure) is what is causing the failure. Alternatively, if it is determined that the fuel control valve position and/or the rail pressure variations have not increased (e.g., decreased, remained constant, etc.), then a filter failure 340 (e.g., filter plugging) is what is causing the failure. In other words, at operation 336, the computing device 136 may determine whether the failure/impending failure is to be classified as a HPCR pump failure or a filter plugging failure.

Figure 4:
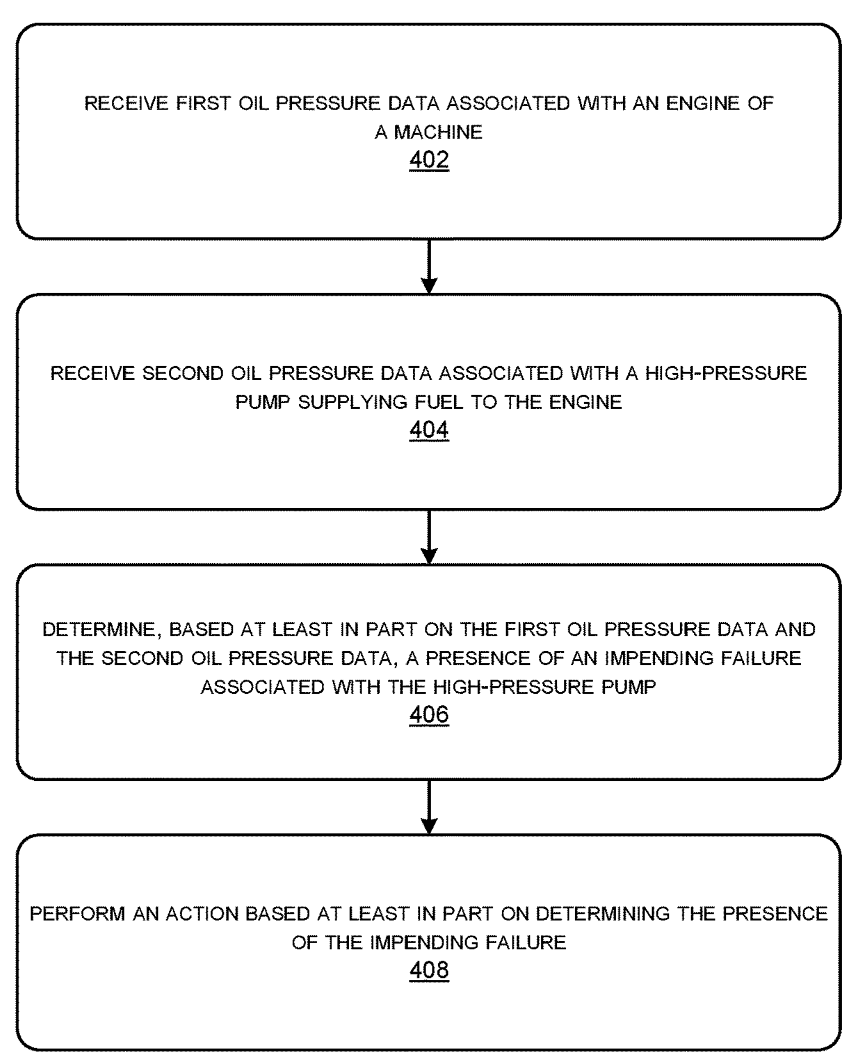
FIG. 4 is a flow diagram illustrating an example method for detecting failures associated with a HPCR fuel injection system, in accordance with various examples of the presently disclosed subject matter.

FIG. 4 is a flow diagram illustrating an example method 400 for detecting failures associated with a HPCR fuel injection system, in accordance with various examples of the presently disclosed subject matter. The method 400 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes The method 400 begins at operation 402, which includes receiving first oil pressure data associated with an engine of a machine. For instance, the computing device 136 may receive the first oil pressure data associated with the engine 102. In examples, the first oil pressure data may be received from, or generated by, the first oil pressure sensor 120 illustrated in FIG. 1. As such, the first oil pressure data may be indicative of an input oil pressure flowing into both the engine 102 and the high-pressure pump 108.

At operation 404, the method 400 includes receiving second oil pressure data associated with a high-pressure pump supplying fuel to the engine. For instance, the computing device 136 may receive the second oil pressure data associated with the high-pressure pump 108 supplying the fuel 104 to the engine 102 (e.g., via the common rail 110 and the injectors 112). In some examples, the second oil pressure data may be received from the second oil pressure sensor 124, and the second oil pressure data may be indicative of an input oil pressure flowing into the high-pressure pump 108.

At operation 406, the method 400 includes determining, based at least in part on the first oil pressure data and the second oil pressure data, a presence of an impending failure associated with the high-pressure pump. For instance, the computing device 136 may be configured to determine, based at least in part on the first oil pressure data and the second oil pressure data, the presence of the impending failure associated with the high-pressure pump 108. That is, the computing device 136 may be capable of detecting a failure associated with the high-pressure pump 108, and/or the HPRC fuel distribution system in general, prior to the failure actually occurring at a magnitude that causes an engine 102 failure and/or an unplanned stop. In some examples, the presence of the impending failure may be determined, by the computing device 136, based on a value of the difference relative to a first threshold, as well as the second oil pressure value relative to a second threshold, such as illustrated in the failure patterns 208 and 322, described above. For instance, if the difference is greater than the first threshold and the second oil pressure value is less than the second threshold, the impending failure may be confirmed. Additionally, or alternatively, if the difference is less than the first threshold and the second oil pressure value is greater than the second threshold, then the impending failure may also be confirmed. In other words, the computing device monitors two different, but related, oil pressure signals, one of which varies more than the other during a failure and utilizing the difference between the signals to detect the failure. Additionally, in some examples, the method may also include classifying the error as either a HPCR pump lower end failure or a plugged spin-on oil filter.

At operation 408, the method 400 includes performing an action based at least in part on determining the presence of the impending failure. For instance, the computing device 136 may perform one or more actions based at least in part on detecting the impending failure. As an example, the computing device 136 may cause an indication or notification of the impending failure to be sent, over a network, to a computing device associated with an end user of the engine 102 (e.g., send an email alert). Additionally, or alternatively, the computing device 136 may set an error flag, cause a warning to be displayed (e.g., on a dashboard of a machine that includes the system 100), by providing an indication to a user or machine profile to which the system 100 is associated with, and/or the like. In some examples, the action may comprise causing the engine to stop operating. Additionally, in some examples, the action may comprise switching from a primary HPCR system to an auxiliary/backup HPCR system, pump, filter, etc. In some examples, the action may include restricting an operating limit of the engine (e.g., refrain from allowing the engine to operate over a certain RPM value, etc.).

Figure 5:
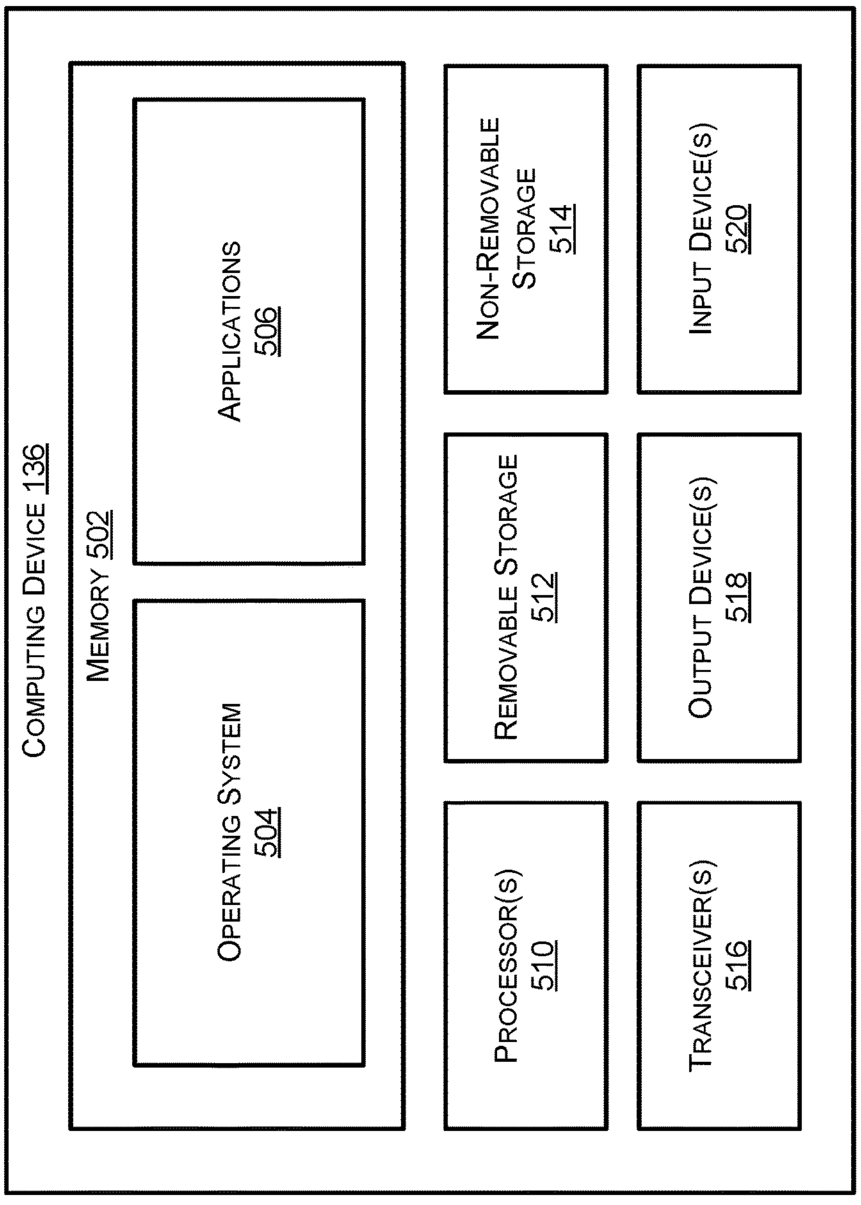
FIG. 5 is a block diagram illustrating example detail of a computing device that may be configured to perform various aspects of the techniques disclosed herein in accordance with various examples of the presently disclosed subject matter.

FIG. 5 is a block diagram illustrating example detail 500 of the computing device 136 that may be configured to perform various aspects of the techniques disclosed herein in accordance with various examples of the presently disclosed subject matter. The computing device 136 could be any device capable of providing the functionality associated with the systems and methods described herein. The computing device 136 can comprise several components to execute the above-mentioned functions. The computing device 136 may be comprised of hardware, software, or various combinations thereof. As discussed below, the computing device 136 can comprise memory 502 including an operating system (OS) 504 and one or more standard applications 506. The standard applications 506 may include applications that provide for the HPCR pump lower-end failure and/or spin-on filter plugging detection algorithms and techniques described herein.

The computing device 136 can also comprise one or more processors 510 and one or more of removable storage 512, non-removable storage 514, transceiver(s) 516, output device(s) 518, and input device(s) 520. In various implementations, the memory 502 can be volatile (such as random-access memory (RAM)), non-volatile (such as read only memory (ROM), flash memory, etc.), or some combination of the two. The memory 502 can include data pertaining to signals and sensor data (e.g., oil pressure sensor data), and other information, and can be stored on a remote server or a cloud of servers accessible by the computing device 136.

The memory 502 can also include the OS 504. The OS 504 varies depending on the manufacturer of the computing device 136. The OS 504 contains the modules and software that support basic functions of the computing device 136, such as scheduling tasks, executing applications, and controlling peripherals. The OS 504 can also enable the computing device 136 to send and retrieve other data and perform other functions, such as performing the actions disclosed herein responsive to detecting a failure/impending failure.

The computing device 136 can also comprise one or more processors 510. In some implementations, the processor(s) 510 can be one or more central processing units (CPUs), graphics processing units (GPUs), both CPU and GPU, or any other combinations and numbers of processing units. The computing device 136 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the computing device 136. Any such non-transitory computer-readable media may be part of the computing device 136 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the computing device 136 and one or more pumps or valves), the Internet, and/or an intranet. Specifically, the transceiver(s) 516 can include one or more transceivers that can enable the computing device 136 to send and receive data. Thus, the transceiver(s) 516 can include multiple single-channel transceivers or a multi-frequency, multi-channel transceiver to enable the computing device 136 to send and receive video calls, audio calls, messaging, etc. The transceiver(s) 516 can enable the computing device 136 to connect to multiple networks including, but not limited to 2G, 3G, 4G, 5G, and Wi-Fi networks. The transceiver(s) 516 can also include one or more transceivers to enable the computing device 136 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the computing device 136 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518. Other examples of input device(s) 520 may include the sensors described above and herein, such as the oil pressure sensors, oil temperature sensors, barometric pressure sensors, as well as other devices that provide input data to the computing device 136.

Figure 6:
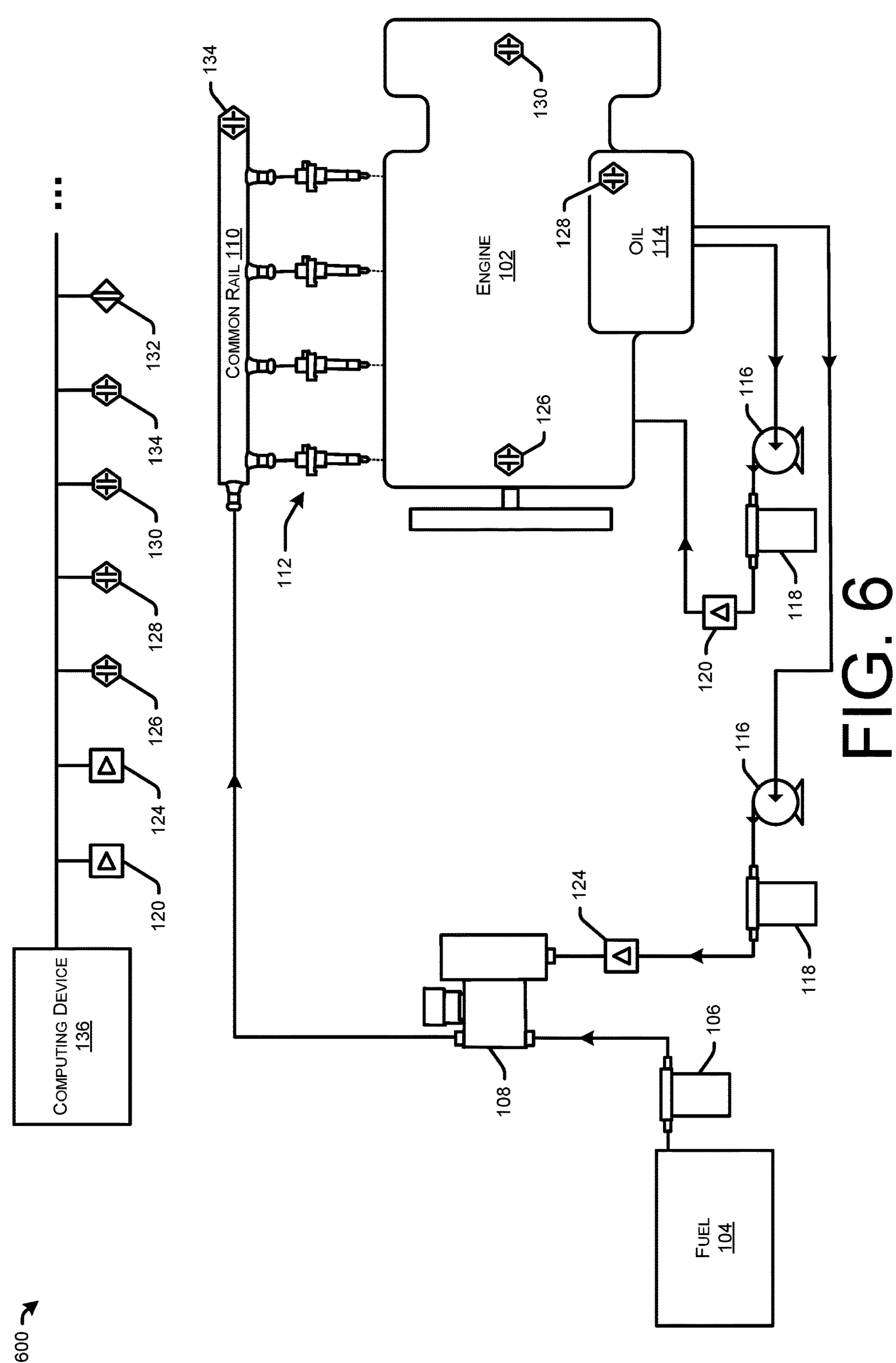
FIG. 6 is a schematic illustration of another example system that may utilize aspects of the technologies disclosed herein to detect failures associated with a HPCR fuel injection system, in accordance with one or more examples of the present disclosure.

FIG. 6 is a schematic illustration of another example system 600 that may utilize aspects of the technologies disclosed herein to detect failures associated with a HPCR fuel injection system, in accordance with one or more examples of the present disclosure. The main difference between the system 100 and the system 600 is the oil supply lines for the high-pressure pump 108 and the engine 102 are separate. For instance, the oil supply line for the high-pressure pump 108 includes its own oil pump 116 for supplying oil to the high-pressure pump 108. The techniques disclosed herein are equally applicable to both of the systems 100 and 600. However, the oil pressure from the sensor 120 in FIG. 6 is the oil pressure for the engine 102, and the oil pressure from the sensor 124 in FIG. 6 is the oil pressure for the high-pressure pump 108 (e.g., as opposed to a single sensor reading pressure for both the engine 102 and the high-pressure pump 108 as illustrated in FIG. 1).

INDUSTRIAL APPLICABILITY

The present disclosure relates generally to techniques for detecting failures associated with a high-pressure common rail (HPCR) fuel injection system.

The system 100 illustrated in FIG. 1 utilizes a HPCR fuel injection system to provide fuel to the engine 102, and the computing device 136 is configured to detect lower-end failures associated with the high-pressure pump 108 (also referred to herein as an "HPCR pump") and/or failures associated with the oil filter 118, which filters oil 114 used to lubricate components of the high-pressure pump 108. The computing device 136 can detect these failures by monitoring oil pressure data received from the first oil pressure sensor 120 and the second oil pressure sensor 124, as well as classify whether a failure is a lower-end pump failure or an oil filter failure. By being able to detect these HPCR system-related failures as soon as possible as the techniques described herein have enabled, engine shutdowns resulting in on-road failures and un-scheduled stopping can be avoided. Additionally, the classification of failures utilizing the disclosed techniques helps in troubleshooting and arranging replacement parts, if needed.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method comprising:

supplying fuel to a prime mover of a machine, with a high-pressure pump, while the machine performs an operation;

receiving, from a first oil pressure sensor, first oil pressure data associated with oil directed to the prime mover;

receiving, from a second oil pressure sensor downstream from the first oil pressure sensor and upstream of the high-pressure pump, second oil pressure data associated with oil bypassing the prime mover and directed to the high-pressure pump;

determining, based at least in part on the first oil pressure data and the second oil pressure data, an impending failure associated with the high-pressure pump; and sending, over a communication network, an indication of the impending failure to a computing device associated with an end user of the machine.

2. The method of claim 1, further comprising:

determining, based at least in part on the first oil pressure data, a first oil pressure value associated with the prime mover;

determining, based at least in part on the second oil pressure data, a second oil pressure value associated with the high-pressure pump; and determining a difference between the first oil pressure value and the second oil pressure value, wherein the impending failure is determined based on a value of the difference relative to a first threshold and the second oil pressure value relative to a second threshold.

3. The method of claim 1, further comprising determining a cause of the impending failure based at least in part on a determination of whether at least one of a fuel control valve position or a rail pressure variation has increased or remained constant, the cause comprising at least one of a lower end failure associated with the high-pressure pump or a filter failure associated with the high-pressure pump.

4. The method of claim 3, wherein determining that the cause of the impending failure is the lower end failure based at least in part on determining an increase in at least one of the fuel control valve position or the rail pressure variation.

5. The method of claim 3, wherein determining that the cause of the impending failure is the filter failure based at least in part on determining that at least one of the fuel control valve position or the rail pressure variation has remained constant.

6. The method of claim 1, wherein the first oil pressure data and the second oil pressure data are received during a first data collection period, and determining the impending failure comprises:

determining, based at least in part on the first oil pressure data and the second oil pressure data, that a failure condition is satisfied during the first data collection period;

receiving, during a second data collection period, third oil pressure data associated with the prime mover;

receiving, during the second data collection period, fourth oil pressure data associated with the high-pressure pump;

determining, based at least in part on the third oil pressure data and the fourth oil pressure data, that the failure condition is satisfied during the second data collection period; and determining the impending failure based at least in part on the failure condition being satisfied during both the first data collection period and the second data collection period.

7. The method of claim 6, wherein the failure condition comprises at least one of:

a difference between the first oil pressure data and the second oil pressure data being greater than a first threshold, and the second oil pressure data being less than a second threshold; or the difference being less than a third threshold, and the second oil pressure data being greater than a fourth threshold.

8. The method of claim 6, wherein determining the impending failure is further based at least in part on a determination that no more than one other data collection period intervened between the first data collection period and the second data collection period.

9. The method of claim 1, wherein determining the impending failure is further based at least in part on additional sensor input data, the additional sensor input data including at least one of prime mover power data, oil temperature data, barometric pressure data, or prime mover speed data.

10. The method of claim 1, wherein:

the high-pressure pump is a high-pressure common rail pump that pressurizes fuel in a common rail, the common rail connected to an injector associated with the prime mover, the first pressure sensor is disposed upstream of a split in an oil supply line facilitating distribution of oil to the prime mover and the high-pressure pump, the second pressure sensor is disposed between the split and the high-pressure pump.

11. A system, comprising:

one or more processors; and one or more non-transitory computer-readable media storing instructions that, when executed, cause the one or more processors to perform operations comprising:

receiving, from a first oil pressure sensor, first oil pressure data associated with oil directed to an engine of a machine;

receiving, from a second oil pressure sensor downstream from the first oil pressure sensor and upstream of a high-pressure pump supplying fuel to the engine, second oil pressure data associated with oil bypassing the engine and directed to the high-pressure pump;

determining, based at least in part on the first oil pressure data and the second oil pressure data, an impending failure associated with the high-pressure pump; and sending, over a communication network, an indication of the impending failure to a computing device associated with an end user of the machine.

12. The system of claim 11, the operations further comprising:

determining, based at least in part on the first oil pressure data, a first oil pressure value associated with the engine;

determining, based at least in part on the second oil pressure data, a second oil pressure value associated with the high-pressure pump; and determining a difference between the first oil pressure value and the second oil pressure value, wherein the impending failure is determined based on a value of the difference relative to a first threshold and the second oil pressure value relative to a second threshold.

13. The system of claim 11, the operations further comprising determining a cause of the impending failure based at least in part on a determination of whether at least one of a fuel control valve position or a rail pressure variation has increased or remained constant, the cause comprising at least one of a lower end failure associated with the high-pressure pump or a filter failure associated with the high-pressure pump.

14. The system of claim 13, wherein determining that the cause of the impending failure is the lower end failure based at least in part on determining an increase in at least one of the fuel control valve position or the rail pressure variation.

15. The system of claim 13, wherein determining that the cause of the impending failure is the filter failure based at least in part on determining that at least one of the fuel control valve position or the rail pressure variation has remained constant.

16. The system of claim 11, wherein the first oil pressure data and the second oil pressure data are received during a first data collection period and determining the impending failure comprises:

determining, based at least in part on the first oil pressure data and the second oil pressure data, that a failure condition is satisfied during the first data collection period;

receiving, during a second data collection period, third oil pressure data associated with the engine;

receiving, during the second data collection period, fourth oil pressure data associated with the high-pressure pump;

determining, based at least in part on the third oil pressure data and the fourth oil pressure data, that the failure condition is satisfied during the second data collection period; and determining the impending failure based at least in part on the failure condition being satisfied during both the first data collection period and the second data collection period.

17. The system of claim 16, wherein the failure condition comprises at least one of:

a difference between the first oil pressure data and the second oil pressure data being greater than a first threshold and the second oil pressure data being less than a second threshold; or the difference being less than a third threshold and the second oil pressure data being greater than a fourth threshold.

18. A system comprising:

a first oil pressure sensor for measuring input oil pressure flowing to an engine of a machine and a high-pressure common rail (HPCR) pump associated with a fuel distribution system of the machine;

a second oil pressure sensor downstream of the first oil pressure sensor and upstream of the HPCR pump, the second oil pressure sensor being configured to measure the input oil pressure of oil bypassing the engine and flowing to the HPCR pump;

one or more processors; and one or more non-transitory computer-readable media storing instructions that, when executed, cause the one or more processors to perform operations comprising:

determining, based at least in part on first oil pressure data generated by the first oil pressure sensor, a first oil pressure value associated with the input oil pressure flowing to the engine and the HPCR pump;

determining, based at least in part on second oil pressure data generated by the second oil pressure sensor, a second oil pressure value associated with the input oil pressure flowing to the HPCR pump;

determining a difference between the first oil pressure value and the second oil pressure value;

determining an impending failure associated with the HPCR pump based at least in part on the difference and the second oil pressure value; and sending, over a communication network, an indication of the impending failure to a computing device associated with an end user of the machine.

19. The system of claim 18, wherein the impending failure is determined based on a value of the difference relative to a first threshold and the second oil pressure value relative to a second threshold.

20. The system of claim 18, the operations further comprising determining a cause of the impending failure based at least in part on monitoring movement of a fuel control valve or pressure variations of a common rail, the cause comprising at least one of a lower end failure associated with the HPCR pump or a spin-on filter failure associated with the HPCR pump.

* * * * *